US012607900B1

(12) United States Patent
Rathnasinghe et al.

(10) Patent No.: US 12,607,900 B1
(45) Date of Patent: Apr. 21, 2026

(54) CARRIER WITH END STOP FOR CAMERA TILT ACTUATOR

(71) Applicant: Apple Inc., Cupertino, CA (US)

(72) Inventors: Hiran R Rathnasinghe, Lemon Grove, CA (US); Nicholas D Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 903 days.

(21) Appl. No.: 17/929,296

(22) Filed: Sep. 1, 2022

Related U.S. Application Data

(60) Provisional application No. 63/241,454, filed on Sep. 7, 2021.

(51) Int. Cl.
    *G03B 5/00* (2021.01)
    *H04N 23/55* (2023.01)

(52) U.S. Cl.
    CPC ............... *G03B 5/00* (2013.01); *H04N 23/55* (2023.01); *G03B 2205/0023* (2013.01); *G03B 2205/003* (2013.01); *G03B 2205/0069* (2013.01)

(58) Field of Classification Search
    CPC .... G03B 5/00; G03B 5/06; G03B 2205/0007; G03B 2205/0023; G03B 2205/003; G03B 2205/0038; G03B 2205/0053; G03B 2205/0061; G03B 2205/0069; G03B 2205/0076; G03B 2205/0084; H04N 23/55; H04N 23/685; H04N 23/686; H04N 23/687
See application file for complete search history.

(56) References Cited

U.S. PATENT DOCUMENTS

| | | | |
|---|---|---|---|
| 10,690,815 B2 | 6/2020 | Aschwanden et al. | |
| 2018/0239161 A1* | 8/2018 | Seol ..................... | G02B 27/646 |
| 2019/0049687 A1* | 2/2019 | Bachar ............... | H02K 41/0354 |
| 2019/0170967 A1 | 6/2019 | Jung et al. | |
| 2020/0355910 A1 | 11/2020 | Smolka et al. | |

* cited by examiner

*Primary Examiner* — Stephanie E Bloss
*Assistant Examiner* — Fang-Chi Chang
(74) *Attorney, Agent, or Firm* — Robert C. Kowert; Kowert, Hood, Munyon, Rankin & Goetzel, P.C.

(57) ABSTRACT

Various embodiments include a camera including a carrier having one or more end stops for use with a tilt actuator. The camera may include one or more optical elements, an image sensor, an actuator arrangement, and/or a suspension arrangement. The carrier may be used to carry or otherwise hold one or more optical elements and/or one or more image sensors. The tilt actuator may be used to tilt the carrier relative to one or more other camera components. In various embodiments, the carrier may include one or more surfaces shaped so as to enable a reduction in a range of values of a shortest gap between the carrier and a stationary structure of the camera, across a stroke range.

20 Claims, 9 Drawing Sheets

CARRIER WITH END STOP FOR CAMERA TILT ACTUATOR

This application claims benefit of priority to U.S. Provisional Application Ser. No. 63/241,454, entitled "Carrier with End Stop for Camera Tilt Actuator," filed Sep. 7, 2021, and which is hereby incorporated herein by reference in its entirety.

BACKGROUND

Technical Field

This disclosure relates generally to architecture for a camera including a carrier having one or more end stops for use with a tilt actuator.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 2A shows a perspective view of a camera configured with a carrier having a flat top. FIG. 2B shows a side cross-sectional view of a camera configured with a carrier having one or more end stops for use with the tilt actuator, in accordance with some embodiments.

FIG. 3A shows a side cross-sectional view of an example carrier having a flat top. FIG. 3B shows a side cross-sectional view of an example curved carrier having one or more end stops, in accordance with some embodiments. FIG. 3C shows side cross-sectional views of another example carrier having a flat top. FIG. 3D shows side cross-sectional views of another curved carrier having one or more end stops, in accordance with some embodiments. FIG. 3E shows side cross-sectional views of an example carrier having a pyramid-shaped design and having one or more end stops, in accordance with some embodiments. FIG. 3F shows side cross-sectional views of an example carrier having an inverted curved design and having one or more end stops, in accordance with some embodiments.

Figure 1:
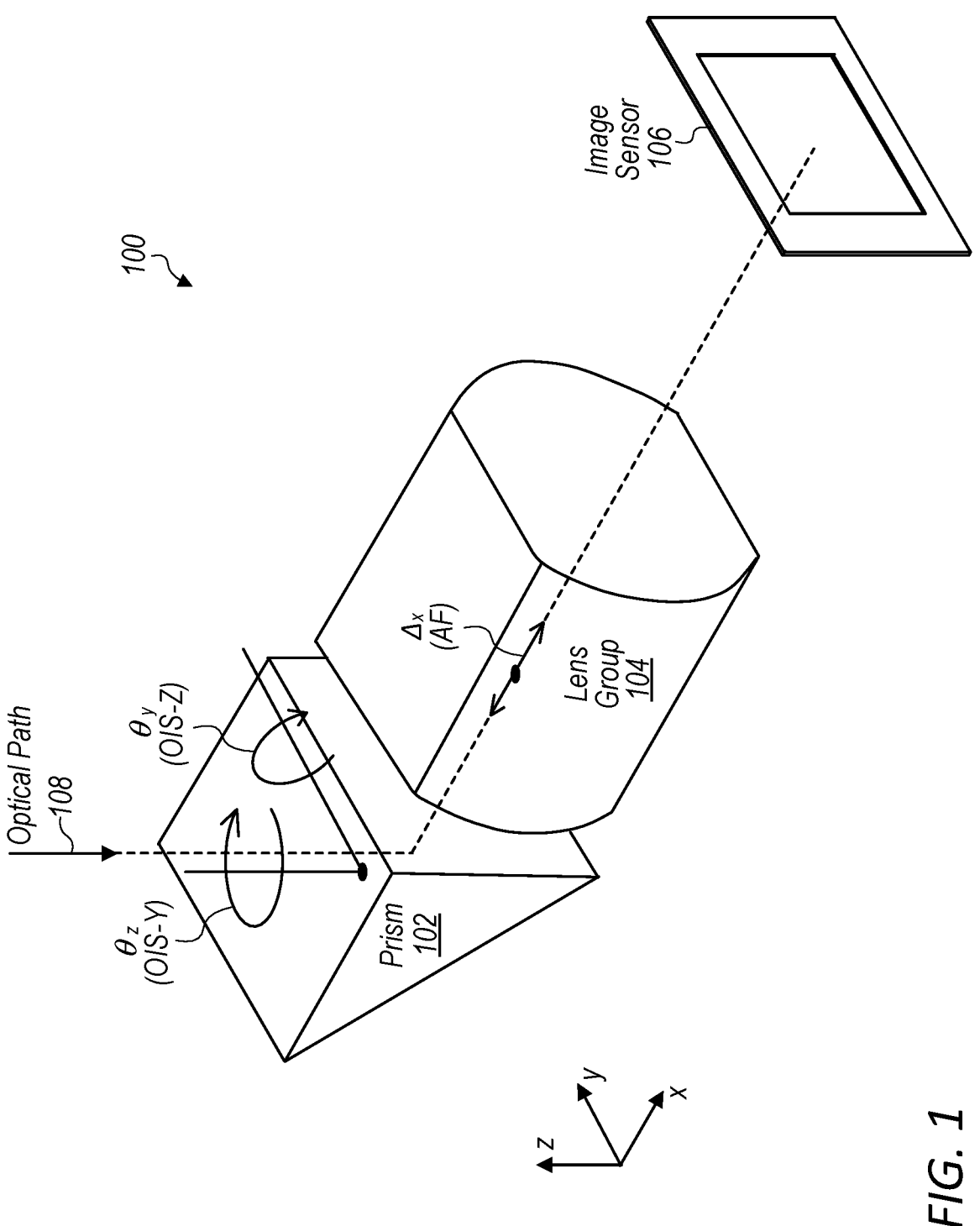
FIG. 1 illustrates a perspective view of an example folded optics arrangement that may be included in a camera configured with a carrier having one or more end stops for use with a tilt actuator, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms.

These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises," and/or "comprising." when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a camera including a carrier having one or more end stops for use with a tilt actuator. The camera may include one or more optical elements, an image sensor, an actuator arrangement (e.g., including a tilt actuator), and/or a suspension arrangement in various embodiments. The carrier may be used to carry or otherwise hold one or more optical elements and/or one or more image sensors. The tilt actuator may be used to tilt the carrier relative to one or more other camera components. In various embodiments, the carrier may be a curved carrier that includes one or more arced surfaces. For example, the carrier may include an arced surface adjacent one or more end stops. In some embodiments, the carrier may have a pyramid-shaped portion. The end stop(s) may limit the range of tilt motion enabled by the tilt actuator, e.g., when the tilt motion causes the end stop(s) to contact one or more other structures (e.g., a stationary structure of the camera, such as a shield can) The arced surface may be spaced apart from the other structure(s) at a non-uniform gap. In some embodiments, a portion (e.g., a center point) of the non-uniform gap may be relatively small, e.g., compared to a larger gap that may be required for a carrier having a flat surface instead of the arced surface.

The relatively smaller, non-uniform gap enabled by using the carrier may utilize space within the camera more efficiently than other carrier designs having the flat surface instead of the arced surface. In some embodiments, the carrier may be configured to move on ball bearings, e.g., such that the carrier suspends an optical element or an image sensor from a base structure of the camera and allows motion (within a range of motion limited at least in part by the end stop(s)) enabled by the tilt actuator. In some embodiments, the relatively smaller center gap enabled by using the carrier may reduce the risk of the ball bearings falling out of their track(s), without affecting tilt performance.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 shows a generalized example of a perspective view of an example folded optics arrangement that may be included in a camera 100 with folded optics configured with a carrier having one or more end stops for use with a tilt actuator, in accordance with some embodiments. The example X-Y-Z coordinate system shown in FIG. 1 is used to discuss aspects of embodiments described throughout this disclosure.

In various embodiments, the camera 100 may include a light path folding element (e.g., prism 102), a lens group 104, and an image sensor 106 (and/or an image sensor package). The lens group 104 may include one or more lens elements. In some embodiments, the lens group 104 may be located between the prism 102 and the image sensor 106. The prism 102 and the lens group 104 may form a folded optics arrangement (e.g., a single fold optics arrangement as indicated in FIG. 1) through which light passes before reaching the image sensor 106. Light may follow an optical path 108 that is folded by prism 102 such that the light is directed towards the lens group 104, passes through the lens group 104, and then reaches the image sensor 106. In some examples, light may enter an object side of the prism 102 along the Z-axis. The prism 102 may redirect the light to propagate along the X-axis (which may be parallel to an optical axis defined by the lens group 104), e.g., such that the light exits a lens group facing side of the prism 102 towards the lens group 104. The light may pass through the lens group 104 and continue propagating along the X-axis towards the image sensor 106 (which may be vertically oriented, e.g., such that the image sensor 106 defines a plane that is orthogonal to the X-axis and/or the optical axis defined by the lens group 104). The prism 102, the lens group 104, and/or the image sensor 106 may be positioned along a common axis (e.g., the X-axis, the optical axis defined by the lens group 104, etc.). According to some examples, the optical path 108 may be contained within a plane (e.g., the X-Z plane), and the image sensor 106 may extend along a different plane (e.g., the Y-Z plane).

In some embodiments, the object side of the prism 102 may extend along the X-Y plane. Furthermore, the prism 102 may include a pair of opposing lateral sides that each extend along the X-Z plane, a lens group facing side that extends along the Y-Z plane, and a reflecting surface side that is angled relative to one or more of the other sides of the prism 102. For example, the reflecting surface side of the prism 102 may include a reflective surface that is angled so as to redirect light received from the object side of the prism 102 towards the lens group 104 (via the lens group facing side of the prism 102) and the image sensor 106, as discussed above.

While the light path folding elements are shown in various figures as comprising prisms (e.g., prism 102), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 104) may be integrated with the prism 102 such that the prism 102 acts as a lens element. Additionally, or alternatively, the 102 may be shaped such that the prism 102 acts as a lens element.

In various embodiments, the prism 102 and/or the lens group 104 may be coupled with one or more actuators (e.g., as discussed herein with reference to at least FIGS. 2 and 4) configured to move the prism 102 and/or the lens group 104 to provide optical image stabilization (OIS) and/or autofocus (AF) functionality. For example, the prism 102 may be coupled with actuator(s) configured to tilt or otherwise move the prism 102. As indicated in FIG. 1, in various embodiments the actuator(s) may be configured to tilt the prism 102 about multiple axes to provide OIS functionality. An axis about which the prism 102 may be tilted may also be referred to as a "tilt axis" herein. In some embodiments, the actuator(s) may tilt the prism 102 about the Z-axis (tilt indicated in FIG. 1 as $\theta_z$) to provide OIS-Y movement (e.g., movement that shifts the image projected onto the image sensor 106 in one or more directions parallel to the Y-axis). Additionally, or alternatively, the actuator(s) may tilt the prism 102 about the Y-axis (tilt indicated in FIG. 1 as $\theta_y$) to provide OIS-Z movement (e.g., movement that shifts the image projected onto the image sensor 106 in the Z-axis). In various embodiments, the actuator(s) may be configured to translate or otherwise move the lens group 104. For example, the actuator(s) may linearly translate the lens group 104 along the X-axis (translation indicated in FIG. 1 as $\Delta_x$) to provide AF movement.

Figure 2A:
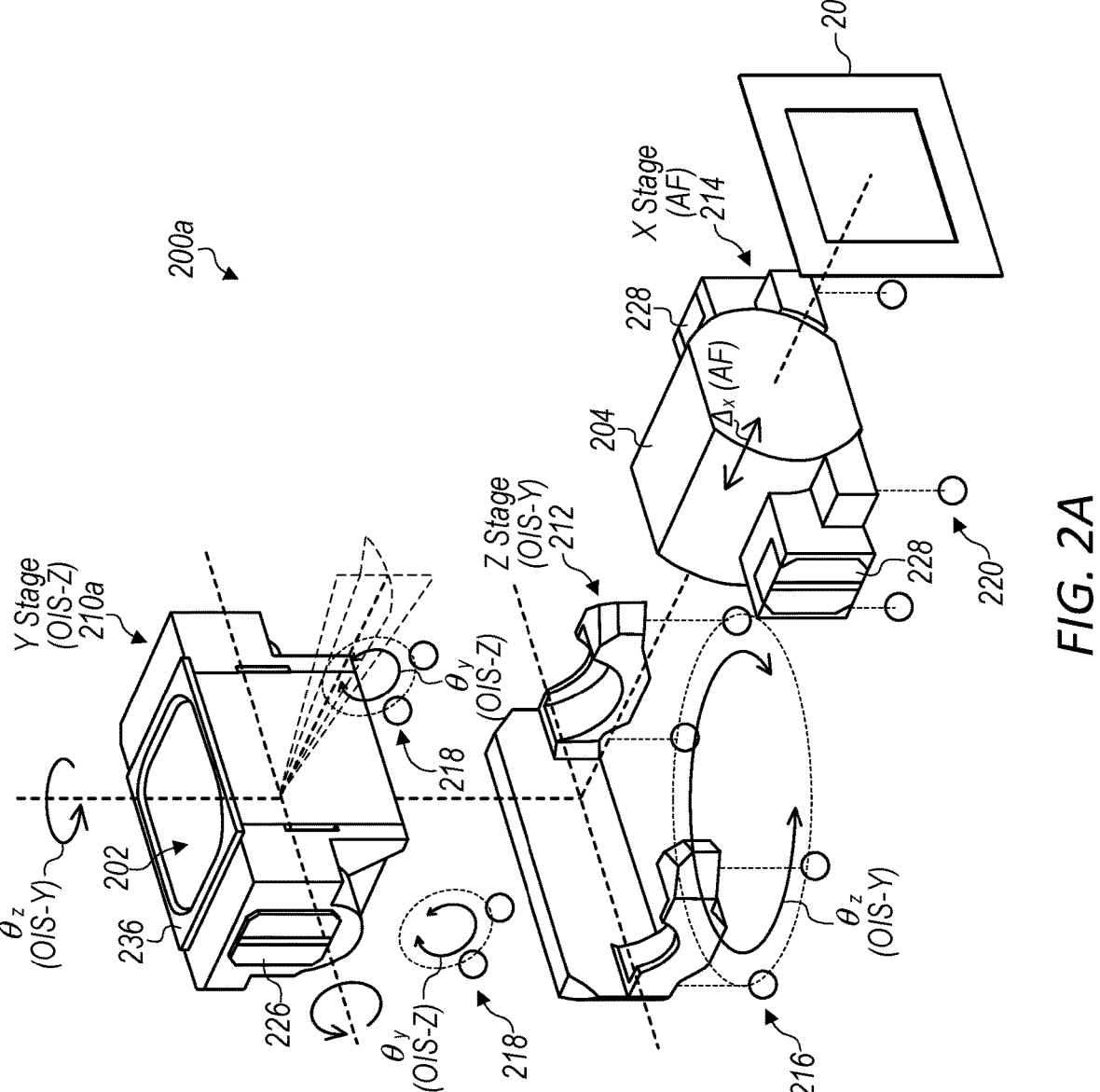
FIGS. 2A-2B illustrate views of an example bearing suspension arrangement that may be included in a camera configured with a tilt actuator.
Figure 2B:
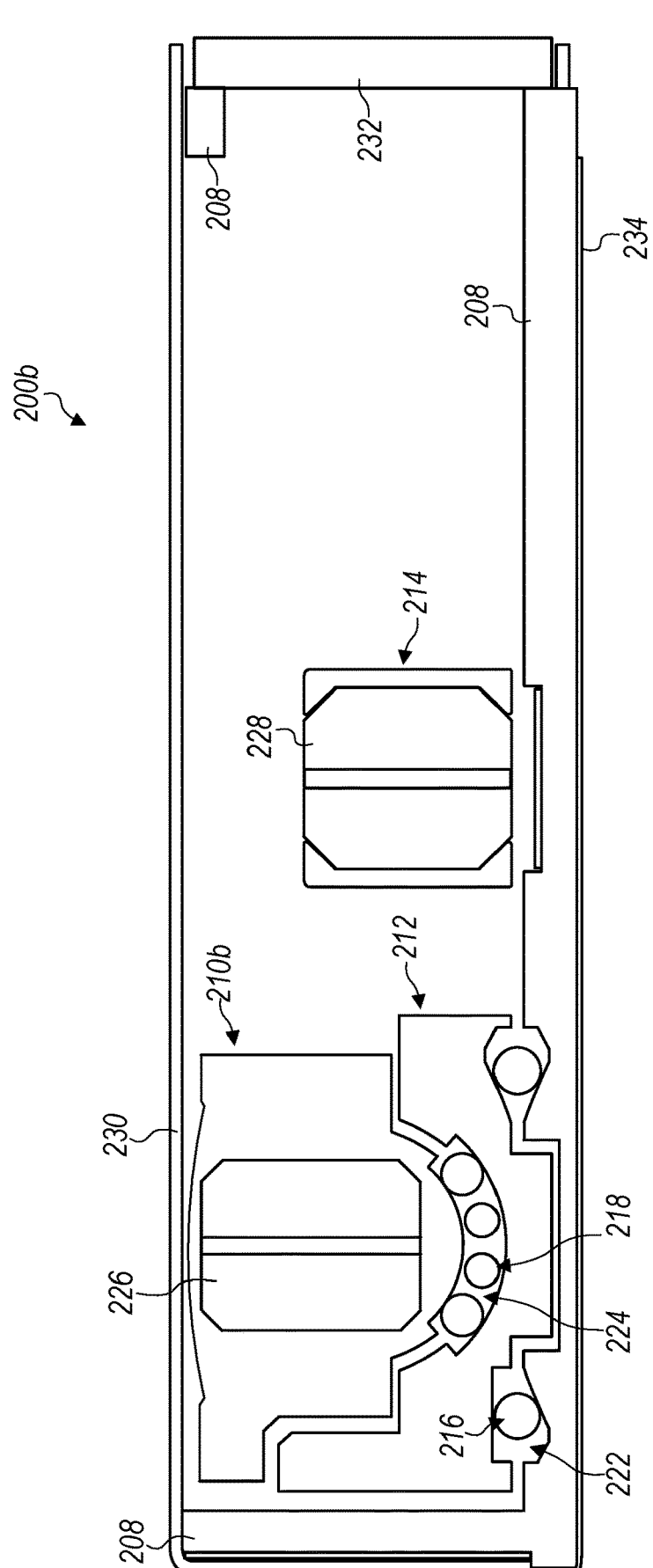

FIGS. 2A-2B illustrate views of an example bearing suspension arrangement that may be included in a camera configured with a tilt actuator. FIG. 2A shows a perspective view of camera 200a, which is configured with a carrier having a flat top. FIG. 2B shows a side cross-sectional view of portions of camera 200b, which is configured with a carrier having one or more end stops for use with the tilt actuator, in accordance with some embodiments. As will be discussed in further detail below, the cameras 200 may include actuators that enable camera components to move to provide OIS and/or AF functionality, e.g., as indicated with reference to the camera 100 in FIG. 1.

According to some embodiments, the cameras 200 may include a prism 202, a lens group 204 (which may include one or more lenses, e.g., within a lens barrel), and an image sensor 206 (and/or image sensor package). In various embodiments, the prism 202, the lens group 204, and the image sensor 206 may form a folded optics arrangement that may be similar to, or the same as, the folded optics arrangement formed by the prism 102, the lens group 104, and the image sensor 106, respectively, in FIG. 1.

In various embodiments, the cameras 200 may include a bearing suspension arrangement and/or an actuator arrangement that may be used for controlled movement of one or more light path folding elements (e.g., prism 202) and/or the lens group 204. In some embodiments, the bearing suspension arrangement may include a base structure 208, a Y stage 210 (Y stage 210a in FIG. 2A; Y stage 210b in FIG. 2B) (also referred to herein as a "carrier"), a Z stage 212, and/or an X stage 214. In FIG. 2A, the prism 202 may be fixedly coupled with Y stage 210a, which is a carrier having a flat top, like the carrier 300a discussed in more detail herein with reference to FIG. 3A. In FIG. 2B, the prism 202 may be coupled with Y stage 210b, which is a carrier having a curved top, like the carrier 300b discussed in more detail herein with reference to FIG. 3B.

The base structure 208 (and/or the image sensor 206) may be in a fixed position relative to movement of the Y stage 210, a Z stage 212, and/or an X stage 214. The bearing suspension arrangement may be coupled with the prism 202 and/or the lens group 204, and may allow the prism 202 and the lens group 204 to move in multiple directions relative to the image sensor 206. For example, the prism 202 may be coupled with the Y stage 210 and the Z stage 212, which may enable movement of the prism 202 in two degrees of freedom (2DOF). Additionally, or alternatively, the lens group 204 may be coupled with the X stage 214, which may enable movement of the lens group 204 in one degree of freedom (1DOF).

Furthermore, the bearing suspension arrangement may include one or more ball bearings (e.g., made of steel, ceramic, etc.). In some embodiments, the bearing suspension arrangement may include one or more Z-tilt ball bearings 216, one or more Y-tilt ball bearings 218, and/or one or more X-translation ball bearings 220.

In some embodiments, the Z stage 212 may rest on (or otherwise be disposed above) a floor portion of the base structure 208, and may be configured to tilt (and/or rotate) about the Z-axis, e.g., via Z-tilt ball bearings 216 disposed between the Z stage 212 and the floor portion of the base structure 208. According to some examples, the Z-axis tilt movement may be used to provide the OIS-Y movement previously mentioned with reference to FIG. 1. According to some embodiments, the Z-tilt ball bearings 216 may reside within a Z-tilt track 222 defined, e.g., by the Z stage 212 and/or the base structure 208. As indicated in FIG. 2B, for example, an underside of the Z stage 212 may be shaped so as to define one or more grooves, recesses, pockets, etc., that at least partially form the Z-tilt track 222. Additionally, or alternatively, a floor portion of the base structure 208 may be shaped so as to define one or more grooves, recesses, pockets, etc., that at least partially form the Z-tilt track 222. In some embodiments, the Z-tilt ball bearings 216 may be disposed in a space of the Z-tilt track 222 that may be sized to accommodate the Z-tilt ball bearings 216 between the underside of the Z stage 212 and the floor portion of the base structure 208. In various embodiments, the Z-tilt track 222 may be curved (e.g., forming a curve that follows a plane parallel to the X-Y plane) so that movement of the Z stage 212 on the Z-tilt ball bearings 216 along a path of motion allowed by the Z-tilt track 222 provides the Z-axis tilt movement of the Z-stage 212 (e.g., together with the Y stage 210 and the prism 202).

In some embodiments, the Y stage 210 may rest on (or otherwise be disposed above) the Z stage 212, and may be configured to tilt (and/or rotate) about the Y-axis, e.g., via Y-tilt ball bearings 218 disposed between the Y stage 210 and the Z stage 212. According to some embodiments, the Y-axis tilt movement may be used to provide the OIS-Z movement previously mentioned with reference to FIG. 1. Furthermore, in some embodiments, the Y stage 210 may be configured to tilt about the Z-axis together with the Z stage 212, e.g., due to Z-axis tilt movement of the Z stage 212. According to various embodiments, the prism 202 may be coupled to the Y stage 210, e.g., such that the prism 202 moves together with the Y stage 210.

According to some embodiments, the Y-tilt ball bearings 218 may reside within a Y-tilt track 224 defined, e.g., by the Y stage 210 and/or the Z stage 212. As indicated in FIGS. 2A-2B, for example, an underside of the Y stage 210 may be shaped so as to define one or more grooves, recesses, pockets, etc., that at least partially form the Y-tilt track 224. Additionally, or alternatively, an upper portion of the Z stage 212 may be shaped so as to define one or more grooves, recesses, pockets, etc., that at least partially form the Y-tilt track 224. In some embodiments, the Y-tilt ball bearings 218 may be disposed in a space of the Y-tilt track 224 that may be sized to accommodate the Y-tilt ball bearings 218 between the underside of the Y stage 210 and the upper portion of the Z stage 212. In various embodiments, the Y-tilt track 224 may be curved (e.g., forming a curve that follows a plane parallel to the X-Z plane) so that movement of the Y stage 210 on the Y-tilt ball bearings 218 along a path of motion allowed by the Y-tilt track 224 provides the Y-axis tilt movement of the Y stage 210 (e.g., together with the prism 202).

In some embodiments, the X stage 214 may rest on (or otherwise be disposed above) a floor portion of the base structure 208, and may be configured to translate along the X-axis, e.g., via X-translation ball bearings 220 disposed between the X stage 214 and the floor portion of the base structure 208. According to some embodiments, the X-axis translation movement may be used to provide the AF movement previously mentioned with reference to FIG. 1. In various embodiments, the lens group 204 may be coupled to the X stage 214, e.g., such that the lens group 204 moves together with the X stage 214.

According to some embodiments, the X-translation ball bearings 220 may reside within an X-translation track (not shown) defined, e.g., by the X stage 214 and/or the base structure 208. For example, an underside of the X stage 214 may be shaped so as to define one or more grooves, recesses, pockets, etc., that at least partially form the X-translation track. Additionally, or alternatively, a floor portion of the base structure 208 may be shaped so as to define one or more grooves, recesses, pockets, etc., that at least partially form the X-translation track. In some embodiments, the X-translation ball bearings 220 may be disposed in a space of the X-translation track that may be sized to accommodate the X-translation ball bearings 220 between the underside of the X stage 214 and the floor portion of the base structure 208. In various embodiments, the X-translation track may be straight (e.g., parallel to the X-axis) so that movement of the X stage 214 on the X-translation ball bearings 220 along a path of motion allowed by the X-translation track provides the X-axis translation movement of the X stage 214 (e.g., together with the lens group 204).

In various embodiments, the actuator arrangement may provide for moving the prism 202 and/or the lens group 204 (e.g., via movement of the Y stage 210, the Z stage 212, and/or the X stage 214, as described herein) to provide OIS and/or AF movement. In some embodiments, the actuator arrangement may comprise one or more voice coil motor (VCM) actuators. The VCM actuator(s) may include one or more magnets and one or more coils. The magnets and coils may electromagnetically interact (e.g., when electrical current is provided to the coils) to produce Lorentz forces that move the prism 202 and/or the lens group 204, e.g., via controlled movement in directions allowed by the stages of the bearing suspension arrangement.

In some embodiments, the actuator arrangement may include an OIS-Z VCM actuator (e.g., to provide OIS-Z movement), an OIS-Y movement (e.g., to provide OIS-Y movement), and an AF actuator (e.g., to provide AF movement). For example, the OIS-Z VCM actuator may include one or more OIS-Z magnets 226 and one or more OIS-Z coils (e.g., OIS-Z coil(s) 402 in FIG. 4). The OIS-Z magnet(s) 226 may be attached to the Y stage 210. Furthermore, the OIS-Z coil(s) may be coupled with the base structure 208 (e.g., at lateral side portion(s) of the base structure 208). In some embodiments, the OIS-Z coil(s) may be attached to the base structure 208. In some embodiments, the OIS-Z coil(s) may be coupled with the base structure 208 via a flex circuit (not shown). An OIS-Z magnet 226 and a corresponding OIS-Z coil may be positioned proximate one another so that they are capable of electromagnetically interacting with each other to tilt the prism 202 together with the Y stage 210 about Y-axis, to provide OIS-Z movement.

Figure 4:
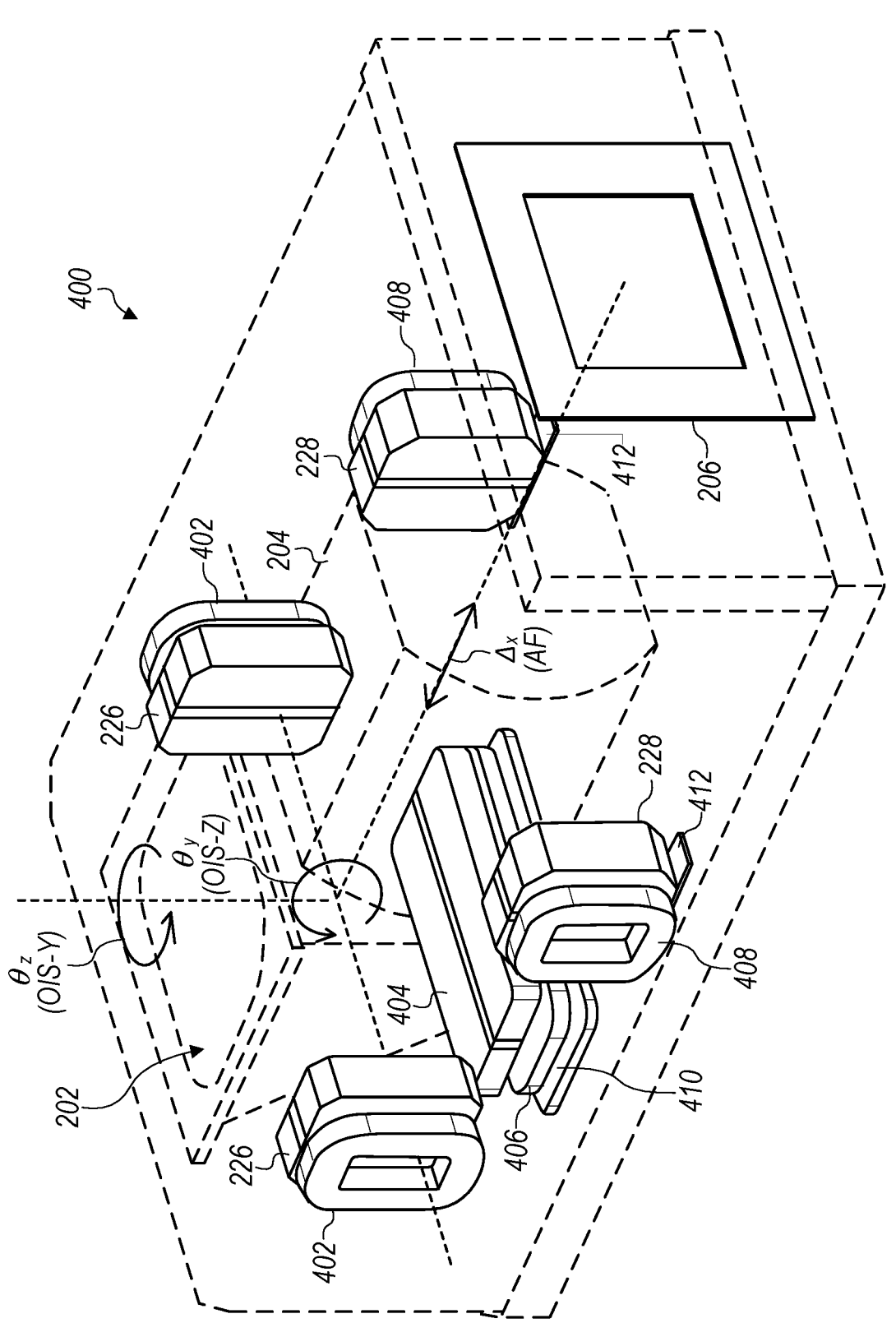
FIG. 4 illustrates a perspective view of an example actuator arrangement that may be included in a camera with a carrier having one or more end stops for use with a tilt actuator, in accordance with some embodiments.

In some embodiments, the OIS-Y VCM actuator may include one or more OIS-Y magnets (e.g., OIS-Y magnet(s) 404 in FIG. 4) and one or more OIS-Y coils (e.g., OIS-Y coil(s) 406 in FIG. 4), e.g., below the prism 202 as indicated in FIG. 4. The OIS-Y magnet(s) may be attached to the Y stage 210 (e.g., a bottom portion and/or underside of the Y stage 210 that faces the floor portion of the base structure 208) and/or to the Z stage 212 (e.g., a bottom portion of the Z stage 212 that faces the floor portion of the base structure 208). Furthermore, the OIS-Y coil(s) may be coupled with the base structure 208 (e.g., a floor portion of the base structure 208). In some embodiments, the OIS-Y coil(s) may be attached to the floor portion of the base structure 208. In some embodiments, the OIS-Y coil(s) may be coupled with the base structure 208 via a flex circuit (not shown). An OIS-Y magnet and a corresponding OIS-Y coil may be positioned proximate one another so that they are capable of electromagnetically interacting with each other to tilt the prism 202 (together with the Z stage 212 and the Y stage 210) about Z-axis, to provide OIS-Y movement.

In some embodiments, the AF VCM actuator may include one or more AF magnets 228 and one or more AF coils (e.g., AF coil(s) 408 in FIG. 4). The AF magnet(s) 228 may be attached to the X stage 214. Furthermore, the AF coil(s) may be coupled with the base structure 208 (e.g., at lateral side portion(s) of the base structure 208). In some embodiments, the AF coil(s) may be attached to the lateral side portion(s) of the base structure 208. In some embodiments, the AF coil(s) may be coupled with the base structure 208 via a flex circuit (not shown). An AF magnet 228 and a corresponding AF coil may be positioned proximate one another so that they are capable of electromagnetically interacting with each other to translate the lens group 204 (together with the X stage 214) along the X-axis, to provide AF movement.

In some embodiments, the base structure 208 may be configured to be packaged around an optical payload (e.g., the folded optics arrangement) on multiple sides. According to some embodiments, one or more other components may be coupled to the base structure 208, such as a shield can 230, a substrate 232 coupled with the image sensor 206, and/or a stiffener 234, etc. The substrate 232 may be configured to hold or otherwise support the image sensor 206.

In some embodiments, the cameras 200 may include a cover plate 236 that covers at least a portion of the prism 202. For example, the cover plate 236 may cover a portion of the object side of the prism 202 (the side through which light enters the prism 202). The cover plate 236 may define an aperture that allows light to pass through the cover plate 236 and enter the prism 202.

Figure 3B:
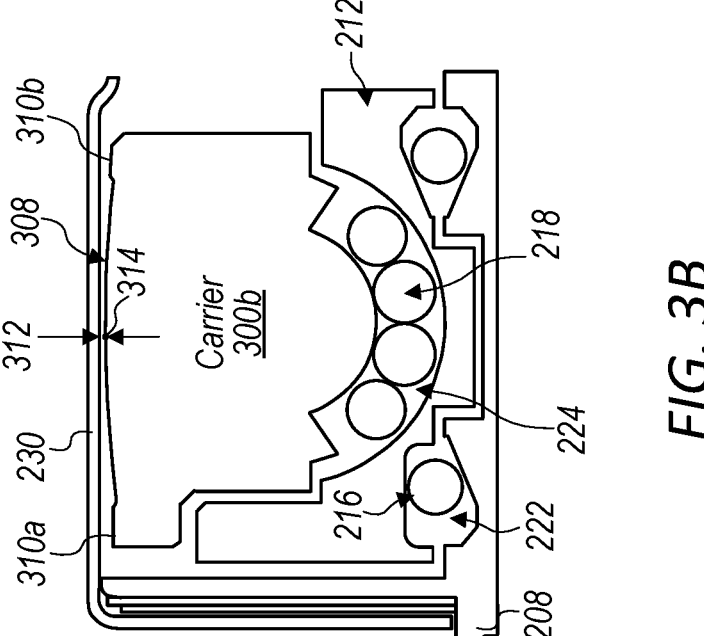
FIGS. 3A-3F illustrate views of example carriers that may be used in a camera with a tilt actuator.
Figure 3A:
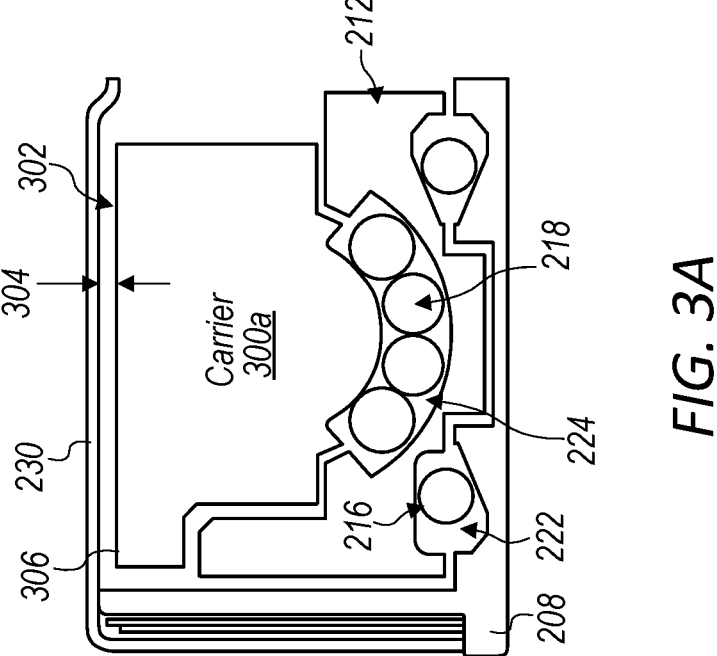

FIGS. 3A-3F illustrate views of example carriers 300 that may be used in a camera with a tilt actuator. FIG. 3A shows a side cross-sectional view of an example carrier 300a having a flat top. For example, in some embodiments the carrier 300a may be the same as, or similar to, the Y stage 210a described herein with reference to FIG. 2A. FIG. 3B shows a side cross-sectional view of an example curved carrier 300b having one or more end stops, in accordance with some embodiments. For example, in some embodiments the curved carrier 300b may be the same as, or similar to, the Y stage 210b described herein with reference to FIG. 2B.

According to various embodiments, the carriers 300 may be included in a camera (e.g., camera 100 in FIG. 1, camera 200a in FIG. 2A, camera 200b in FIG. 2B, camera 400 in FIG. 4, etc.) having a tilt actuator. The camera may include one or more optical elements, an image sensor (e.g., image sensor 106 in FIG. 1, image sensor 206 in FIG. 2A, etc.), and an actuator arrangement (e.g., the actuator arrangements described herein with reference to FIGS. 2A, 2B, and 4). In some embodiments, the optical element(s) may include a light path folding element (e.g., a prism, a mirror, etc.) and/or a lens group (e.g., one or more lens elements). While various embodiments herein are depicted in a folded optics context, it should be appreciated that a camera without a folded optics arrangement may include a tilt actuator that tilts a curved carrier in various embodiments.

As indicated in FIG. 3A, the carrier 300a has a flat top 302 that is spaced apart from a stationary structure (e.g., the shield can 230 that at least partially encases the camera) of the camera at a relatively large gap 304. The gap 304 may be uniform across the flat top 302 of the carrier 300a when the carrier 300a is at a neutral position (e.g., in the middle of the stroke range). As used herein, a "gap" between a carrier and a stationary structure refers to the shortest distance between the carrier and the stationary structure at a given position. For example, an underside of the shield can 230 may define a planar surface that is parallel to a planar surface defined by the flat top 302 of the carrier 300a. According to various embodiments, the relatively large gap 304 (e.g., a relatively wide range of gap values across the stroke range) may be required to allow a minimum functional range of tilt motion about a tilt axis (e.g., about the Y-axis to provide OIS-Z motion as discussed herein with reference to FIGS. 1-2B and 4). In various embodiments, the carrier 300a may include one or more end stops (e.g., end stop 306) configured to limit the tilt motion of the carrier 300a enabled by the tilt actuator. In some embodiments, the range of tilt motion may be limited by the end stop's 306 geometry and position relative to one or more other structures. As a non-limiting example, rotation in a clockwise direction may be stopped when an upper surface of the end stop 306 contacts the underside of the shield can 230. As another non-limiting example, rotation in a counterclockwise direction may be stopped when a lower surface of the end stop 306 contacts an upper surface of the Z stage 212.

Compared to the flat top design of the carrier 300a depicted in FIG. 3A, the curved carrier 300b may utilize space within the camera more efficiently. For example, an end stop portion of the curved carrier 300b may include a side 308 proximate a stationary structure (e.g., shield can 230) and one or more end stops 310 (e.g., end stop 310a and/or end stop 310b). In various embodiments, the side 308 may comprise an arced surface such that the side is spaced apart from the shield can 230 at a non-uniform gap 312 (e.g., in the neutral position and across the stroke range), at least a portion (e.g., a center point 314 of the arced surface) of which may be relatively smaller (e.g., a relatively smaller range of gap values across the same stroke range) than the gap 304 previously mentioned with respect to the carrier 300a in FIG. 3A. In other words, across the same stroke range, the largest possible gap for the curved carrier 300b is smaller than the largest possible gap for the carrier 300a (flat top design). The arced surface may be convex towards the underside of the shield can 230. In some embodiments, a minimum distance, between the center point 314 of the arced surface and a side of the stationary structure (e.g., the underside of the shield can 230) facing the arced surface, may define a minimum of the non-uniform gap 312. The relatively smaller center gap 312 may reduce the risk of ball bearings (e.g., Y-tilt ball bearings 218) falling out, without affecting tilt performance.

As previously mentioned, the curved carrier 300b may be configured to move on ball bearings, such that the curved carrier 300b suspends an optical element or an image sensor from a base structure of the camera and allows motion (within a range of motion limited at least in part by the end stop(s)) enabled by the tilt actuator. In the non-limiting example shown in FIG. 3B, the curved carrier 300b moves on Y-tilt ball bearings 218. The curved carrier 300b suspends an optical element (e.g., prism 102 in FIG. 1, prism 202 in FIGS. 2A-2B, etc.) from base structure 208, and allows tilt motion, within a range of tilt motion limited at least in part by end stop(s) 310, enabled by the tilt actuator.

In some embodiments, an underside of the curved carrier 300b may at least partially define a ball bearing track (e.g., Y-tilt track 224) that interfaces with the ball bearings (e.g., Y-tilt ball bearings 218) to provide tilt motion about a tilt axis (e.g., the Y-axis). According to some embodiments, the underside of the curved carrier 300b may be opposite the side 308 comprising the arced surface adjacent the end stop(s) 310.

In some embodiments, the end stop(s) 310 may include a first end stop 310a and a second end stop 310b. The first end stop 310a may be adjacent the arced surface of side 308, e.g., as indicated in FIG. 3B. In some embodiments, the first end stop 310a may comprise a protrusion having a planar uppermost surface facing the underside of the stationary structure. The first end stop 310a may be configured to limit tilt motion, about a tilt axis, in a clockwise direction and/or a counterclockwise direction. Likewise, the second end stop 310b may be adjacent the arced surface of side 308, e.g., as indicated in FIG. 3B. In some embodiments, the second end stop 310b may comprise a protrusion having a planar uppermost surface facing the underside of the stationary structure. The second end stop 310b may be configured to limit tilt motion, about the tilt axis, in a clockwise direction and/or a counterclockwise direction. In a non-limiting example where the primary stopping features are the uppermost surfaces of the end stops 310 and the underside of the shield can 230, the first end stop 310a may be configured to limit the tilt motion in the clockwise direction, and the second end stop 310b may be configured to limit the tilt motion in the counterclockwise direction.

While terms such as "upper," "lower," "underside," and the like, are used herein for ease of explaining/understanding possible relative positions of various features or components of the camera, it should be understood that the orientation of the curved carrier 310b and/or other features or components may be different in various embodiments. For example, the convexity of the curved arc of side 308 may be upwards towards the underside of the shield can 230 in the example shown in FIG. 3B, the convexity of the curved arc may be oriented in a different direction (e.g., rotated 90 degrees, 180 degrees, 270 degrees, etc., relative to the orientation depicted in FIG. 3B).

Figures 3C, 3D:
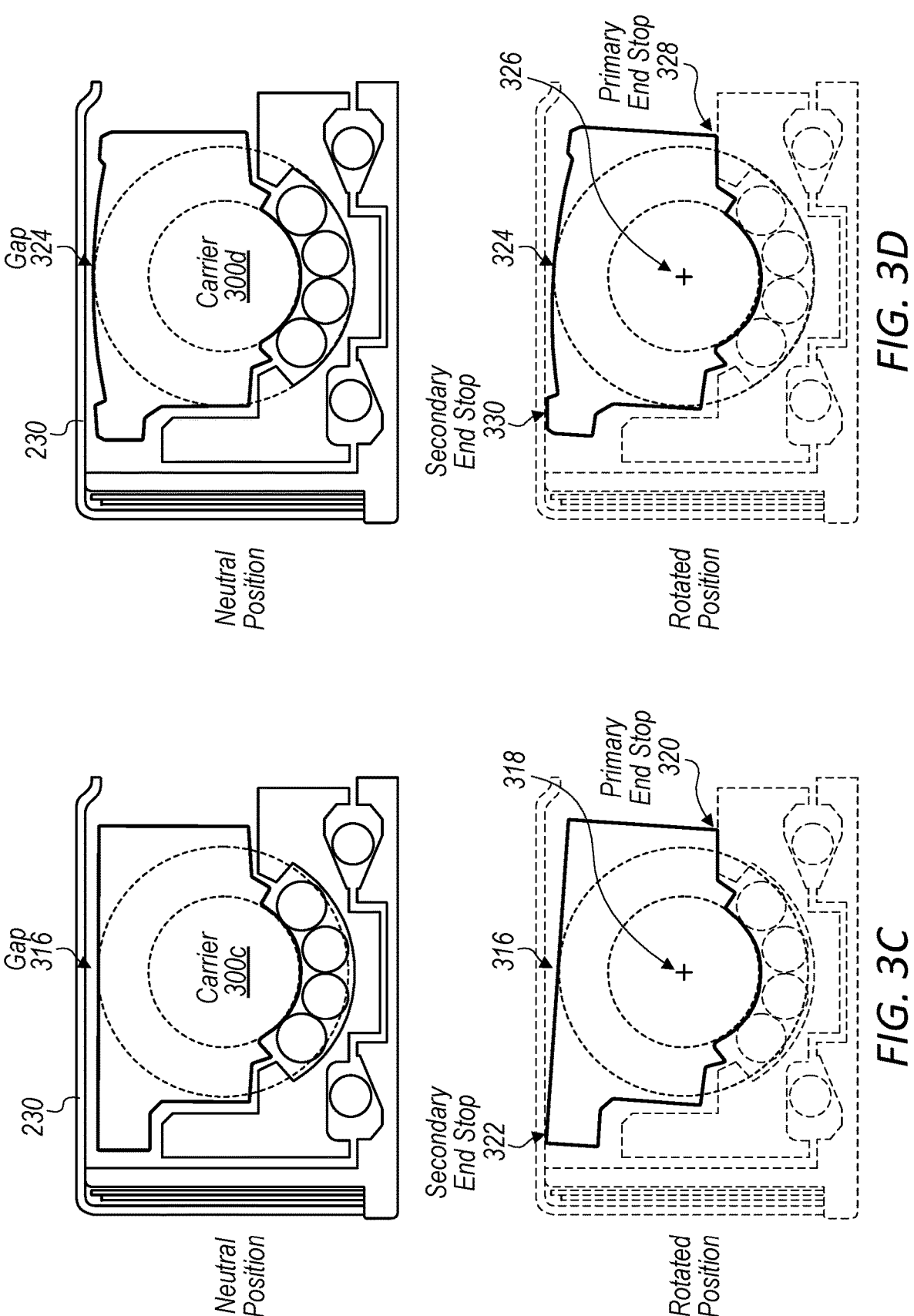

FIG. 3C shows side cross-sectional views of another example carrier 300c having a flat top, similar to the carrier 300a described herein with reference to FIG. 3A. There is a gap 316 between the flat top surface of the carrier 300c and a stationary structure (e.g., the shield can 230 that at least partially encases the camera) of the camera. The gap 316 may change in value across the stroke range, e.g., between the "neutral position and the "rotated position" indicated in FIG. 3C. The carrier 300c may rotate about a rotational center 318 (which defines the rotating center of the optics). Furthermore, the carrier 300c may include a primary end stop 320 that limits tilt motion of the carrier 300c in a first rotational direction (e.g., the clockwise direction) and/or a secondary end stop 322 that limits tilt motion of the carrier 300c in a second rotational direction (e.g., the counterclockwise direction), as indicated in FIG. 3C. In various embodiments, the primary end stop 320 and/or the secondary end stop 322 may be configured to limit rotational motion to other component(s) that are at least partially encased by the shield can 230. Additionally, or alternatively, the primary end stop 320 and/or the secondary end stop 322 may be configured to limit rotational motion to the shield can 230. In the non-limiting example shown in FIG. 3C, the primary end stop 320 is configured to limit rotational motion of the carrier 300c to another component that is at least partially encased by the shield can 230, and the secondary end stop 322 is configured to limit rotational motion of the carrier 300c to the shield can 230. In some other embodiments, a carrier may include a single end stop.

FIG. 3D shows side cross-sectional views of another curved carrier 300d having one or more end stops, similar to the carrier 300b described herein with reference to FIG. 3B. There is a gap 324 between curved top surface of the carrier 300d and a stationary structure (e.g., the shield can 230 that at least partially encases the camera) of the camera. The gap 324 may change in value across the stroke range, e.g., between the "neutral position and the "rotated position" indicated in FIG. 3D. The carrier 300d may rotate about a rotational center 326. Furthermore, the carrier 300d may include a primary end stop 328 that limits tilt motion of the carrier 300d in a first rotational direction (e.g., the clockwise direction) and/or a secondary end stop 330 that limits tilt motion of the carrier 300c in a second rotational direction (e.g., the counterclockwise direction), as indicated in FIG. 3D.

Figures 3E, 3F:
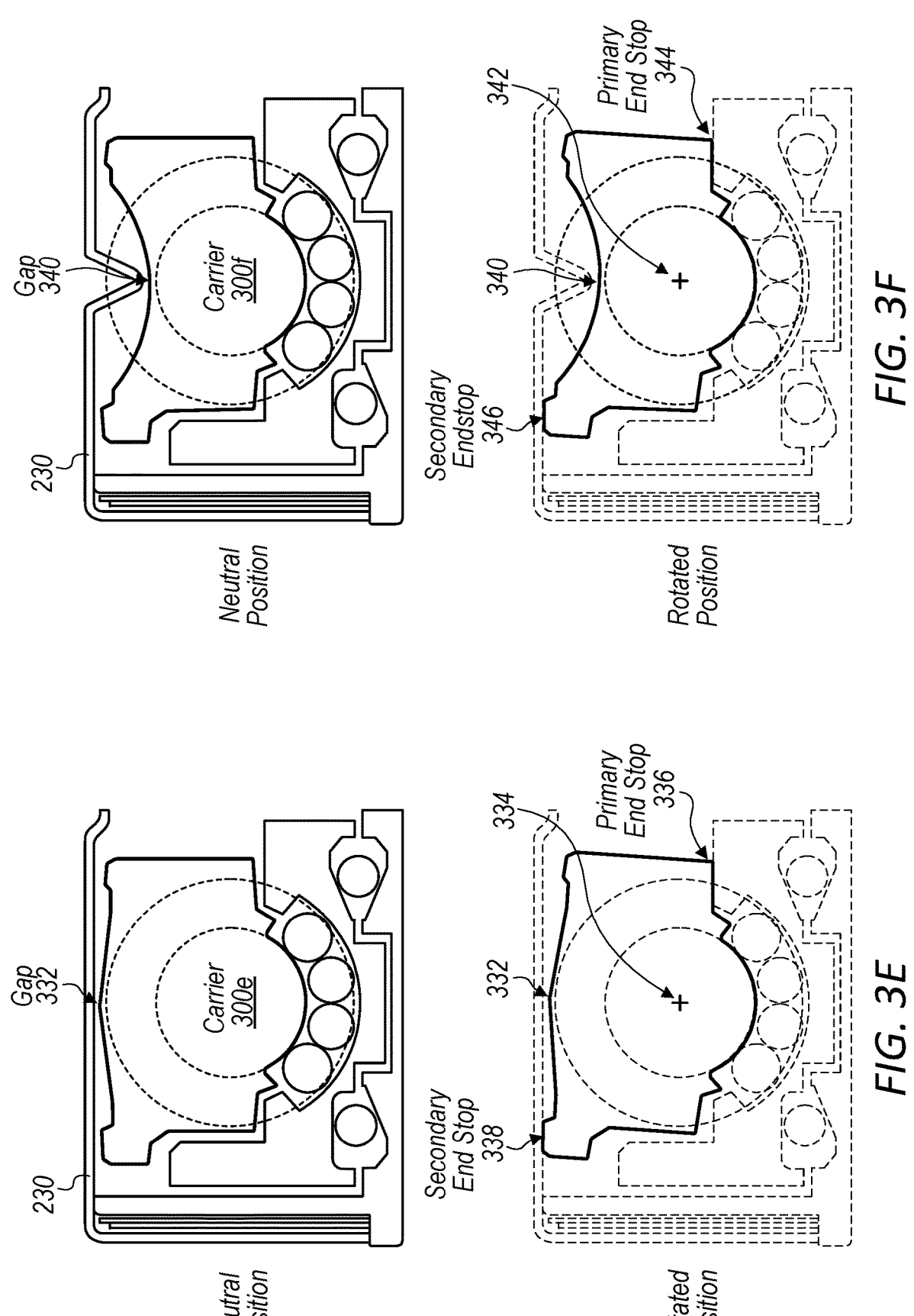

FIG. 3E shows side cross-sectional views of an example carrier 300e having a pyramid-shaped design and having one or more end stops. There is a gap 332 between the pyramid-shaped top surface of the carrier 300d and a stationary structure (e.g., the shield can 230 that at least partially encases the camera) of the camera. The gap 332 may change in value across the stroke range, e.g., between the "neutral position and the "rotated position" indicated in FIG. 3E. The carrier 300e may rotate about a rotational center 334. Furthermore, the carrier 300e may include a primary end stop 336 that limits tilt motion of the carrier 300e in a first rotational direction (e.g., the clockwise direction) and/or a secondary end stop 338 that limits tilt motion of the carrier 300e in a second rotational direction (e.g., the counterclockwise direction), as indicated in FIG. 3E.

FIG. 3F shows side cross-sectional views of an example carrier having an inverted curved design and having one or more end stops. The stationary structure (e.g., the shield can 230 that at least partially encases the camera) of the camera may have a protrusion that extends towards the inverted curved top surface of the carrier 300f. e.g., as indicated in FIG. 3F. There is a gap 340, which may change in value across the stroke range, e.g., between the "neutral position and the "rotated position" indicated in FIG. 3F. The carrier 300f may rotate about a rotational center 342. Furthermore, the carrier 300f may include a primary end stop 344 that limits tilt motion of the carrier 300f in a first rotational direction (e.g., the clockwise direction) and/or a secondary end stop 346 that limits tilt motion of the carrier 300f in a second rotational direction (e.g., the counterclockwise direction), as indicated in FIG. 3F.

Compared to the flat top design of the carrier 300c depicted in FIG. 3C, the carriers 300d-300f may utilize space within the camera more efficiently. In various embodiments the respective gaps of the carriers 300d-300f may have a smaller range of values than the carrier 300c, across the same stroke range. In other words, across the same stroke range, the largest possible gap for the carriers 300d-300f is smaller than the largest possible gap for the carrier 300c (flat top design). The relatively smaller gaps may reduce the risk of ball bearings (e.g., Y-tilt ball bearings 218) falling out, without affecting tilt performance.

FIG. 4 illustrates a perspective view of an example actuator arrangement that may be included in a camera 400 with a carrier (e.g., Y stage/curved carrier 210b in FIG. 2B, curved carrier 300b in FIG. 3B, etc.) having one or more end stops (e.g., end stop(s) 310 in FIG. 3B) for use with a tilt actuator, in accordance with some embodiments. In some embodiments, the actuator arrangement of the camera 400 may be similar to, or the same as, the actuator arrangement of the cameras 200 in FIGS. 2A-2B. For example, the actuator arrangement may include the OIS-Z VCM actuator, the OIS-Y VCM actuator, and the AF VCM actuator discussed above with reference to FIGS. 2A-2B in some embodiments.

According to some embodiments, the OIS-Z VCM actuator may include a first magnet-coil pair and a second magnet-coil pair at opposite sides of the prism 202, e.g., between a respective side of the prism 202 and a respective lateral side of the base structure 208. Each magnet-coil pair may include, e.g., an OIS-Z magnet 226 attached to a side of the Y stage 210, and a corresponding OIS-Z coil 402 coupled with a corresponding lateral side of the base structure 208. In some embodiments, at least a portion of the OIS-Z magnet 226 may be disposed within a recess defined by the Y stage 210, e.g., as indicated in FIG. 2A. In some embodiments, the OIS-Z magnet 226 may be a dual-pole magnet. However, the OIS-Z VCM actuator may additionally, or alternatively, include one or more other types of magnets (e.g., single-pole magnet(s)) in various embodiments. In some embodiments, each of the OIS-Z magnet 226 and the OIS-Z coil 402 may have a respective longest dimension that is parallel to the Z-axis. In some embodiments, the OIS-Z coil 402 may be oriented such that current flows through the coil in directions along a plane parallel to the X-Z plane.

According to some embodiments, the OIS-Y VCM actuator may include an OIS-Y magnet 404 and an OIS-Y coil 406 located below the prism 202. In some embodiments, the OIS-Y magnet 404 may be attached to an underside of the Y stage 210, and the OIS-Y coil 406 may be coupled with the base structure 208 (e.g., at a floor portion of the base structure 208). In some embodiments, at least a portion of the OIS-Y magnet 404 may be disposed within a recess defined by the Y stage 210. In some embodiments, the OIS-Y magnet 404 may be a dual-pole magnet. However, the OIS-Y VCM actuator may additionally, or alternatively, include one or more other types of magnets (e.g., sing-pole magnet(s)) in various embodiments. In some embodiments, each of the OIS-Y magnet 404 and the OIS-Y coil 406 may have a respective longest dimension that is parallel to the Y-axis. In some embodiments, the OIS-Y coil 406 may be oriented such that current flows through the coil in directions along a plane parallel to the X-Y plane.

In some embodiments, the AF VCM actuator may include a first magnet-coil pair and a second magnet-coil pair at opposite sides of the lens group 204, e.g., between a respective side of the lens group 204 and a respective lateral side of the base structure 208. Each magnet-coil pair may include, e.g., an AF magnet 228 attached to a side of the X stage 214, and a corresponding AF coil 408 coupled with a corresponding lateral side of the base structure 208. In some embodiments, at least a portion of the AF magnet 228 may be disposed within a recess defined by the X stage 214, e.g., as indicated in FIG. 2A. In some embodiments, the AF magnet 228 may be a dual-pole magnet. However, the AF VCM actuator may additionally, or alternatively, include one or more other types of magnets (e.g., single-pole magnet(s)) in various embodiments. In some embodiments, each of the AF magnet 228 and the AF coil 408 may have a respective longest dimension that is parallel to the Z-axis. In some embodiments, the AF coil 228 may be oriented such that current flows through the coil in directions along a plane parallel to the X-Z plane.

In various embodiments, the camera 400 may include one or more ferritic components (e.g., formed of iron, stainless steel, etc.) that may be used to preload one or more of the stages against one or more sets of ball bearings of a bearing suspension arrangement (e.g., the bearing suspension arrangements described herein with reference to at least FIGS. 2A-3B). For example, a ferritic component 410 may be positioned below the OIS-Y magnet 404 to preload the Y stage 210 and/or the Z stage 212 against one or more ball bearings of the bearing suspension arrangement (e.g., Z-tilt ball bearings 216 and/or Y-tilt ball bearings 218 in FIGS. 2A-3B). In some embodiments, one or more ferritic components 412 may be positioned below the AF magnet(s) 228 to preload the X stage 214 against one or more ball bearings of the bearing suspension arrangement (e.g., the X-translation ball bearings 220 in FIG. 2A).

Figure 5:
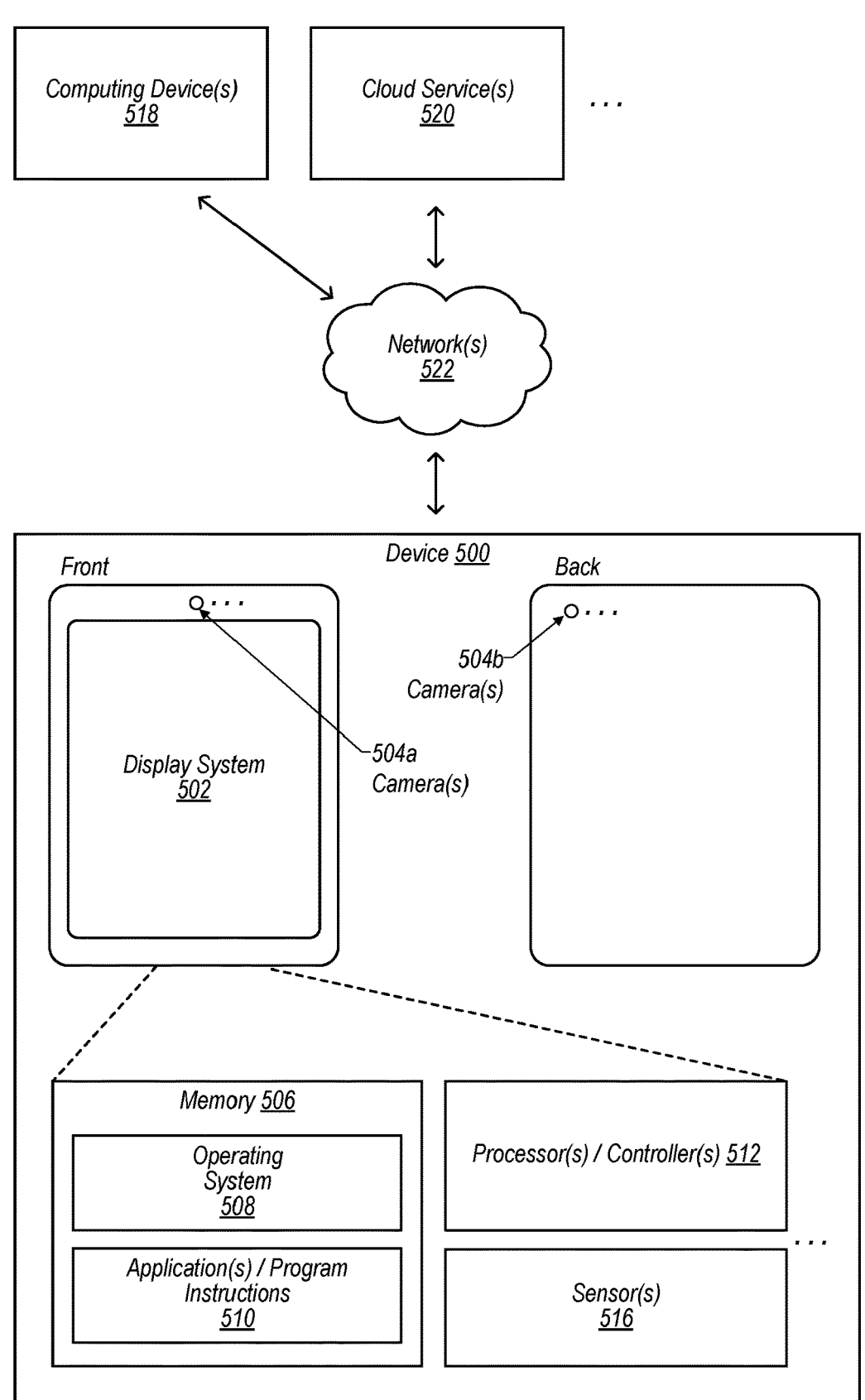
FIG. 5 depicts a schematic representation of an example device that may include a camera with a carrier having one or more end stops for use with a tilt actuator, in accordance with some embodiments.

FIG. 5 depicts a schematic representation of an example device 500 that may include a camera with a carrier having one or more end stops for use with a tilt actuator, in accordance with some embodiments. In various embodiments, the device 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 500 may include a display system 502 (e.g., comprising a display and/or a touch-sensitive surface) and/or one or more cameras 504. In some non-limiting embodiments, the display system 502 and/or one or more front-facing cameras 504a may be provided at a front side of the device 500, e.g., as indicated in FIG. 5. Additionally, or alternatively, one or more rear-facing cameras 504b may be provided at a rear side of the device 500. In some embodiments comprising multiple cameras 504, some or all of the cameras may be the same as, or similar to, each other. Additionally, or alternatively, some or all of the cameras may be different from each other. In various embodiments, the location(s) and/or arrangement(s) of the camera(s) 504 may be different than those indicated in FIG. 5.

Among other things, the device 500 may include memory 506 (e.g., comprising an operating system 508 and/or application(s)/program instructions 510), one or more processors and/or controllers 512 (e.g., comprising CPU(s), memory controller(s), display controller(s), and/or camera controller(s), etc.), and/or one or more sensors 516 (e.g., orientation sensor(s), proximity sensor(s), and/or position sensor(s), etc.). In some embodiments, the device 500 may communicate with one or more other devices and/or services, such as computing device(s) 518, cloud service(s) 520, etc., via one or more networks 522. For example, the device 500 may include a network interface (e.g., network interface 610 in FIG. 6) that enables the device 500 to transmit data to, and receive data from, the network(s) 522. Additionally, or alternatively, the device 500 may be capable of communicating with other devices via wireless communication using any of a variety of communications standards, protocols, and/or technologies.

Figure 6:
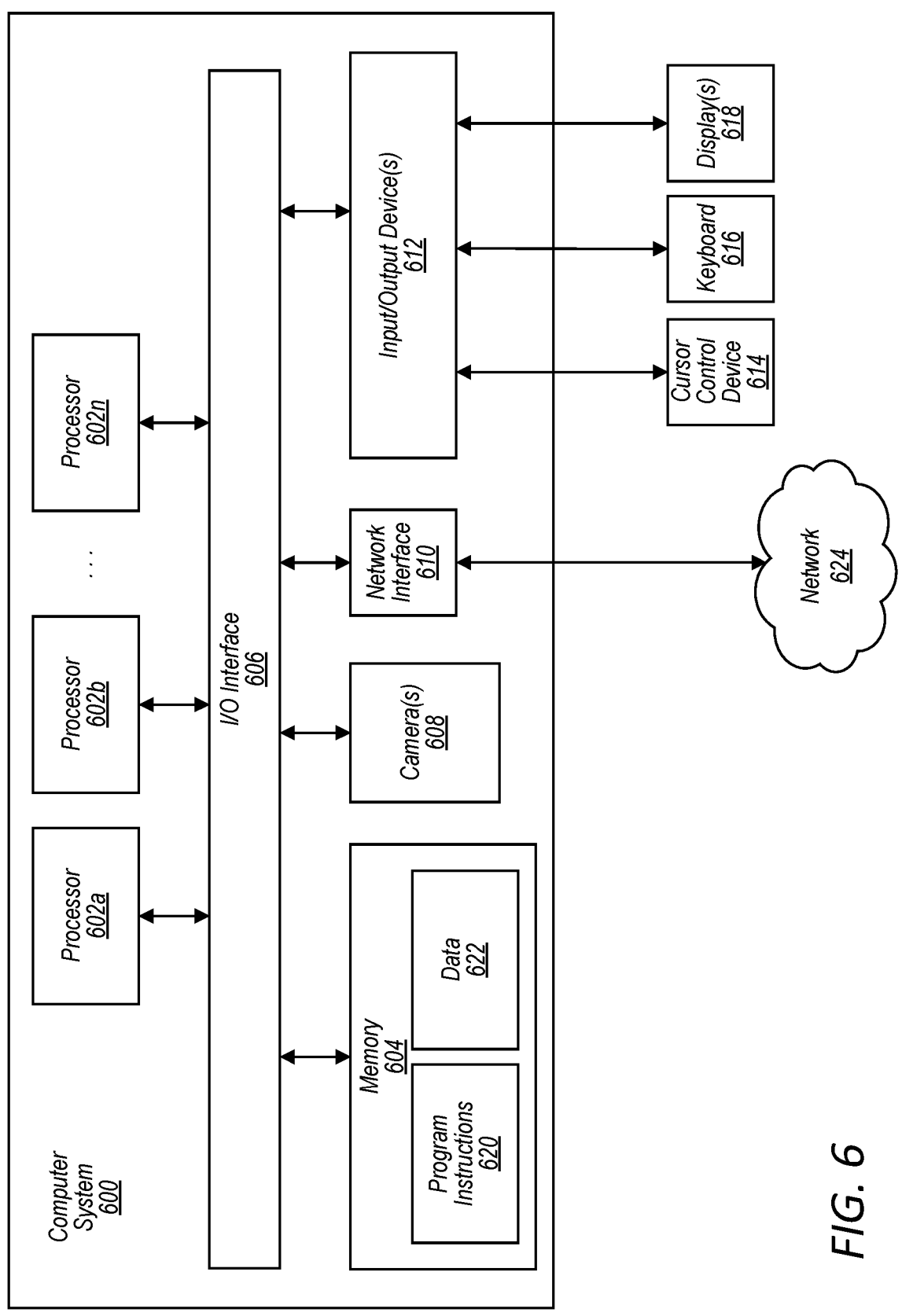
FIG. 6 illustrates an example computer system that may include a camera with a carrier having one or more end stops for use with a tilt actuator, in accordance with some embodiments.

FIG. 6 illustrates a schematic block diagram of an example computing device, referred to as computer system 600, that may include or host embodiments of a camera with a carrier having one or more end stops for use with a tilt actuator, in accordance with some embodiments, e.g., as described herein with reference to FIGS. 1-5. In addition, computer system 600 may implement methods for controlling operations of the camera and/or for performing image processing images captured with the camera. In some embodiments, the device 500 (described herein with reference to FIG. 5) may additionally, or alternatively, include some or all of the functional components of the computer system 600 described herein.

The computer system 600 may be configured to execute any or all of the embodiments described above. In different embodiments, computer system 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 600 includes one or more processors 602 (602a-602n) coupled to a system memory 604 via an input/output (I/O) interface 606. Computer system 600 further includes one or more cameras 608 coupled to the I/O interface 606. Computer system 600 further includes a network interface 610 coupled to I/O interface 606, and one or more input/output devices 612, such as cursor control device 614, keyboard 616, and display(s) 618. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be general-purpose or embedded processors implementing any of a variety of instruction set architectures (ISAs), such as the x86, PowerPC, SPARC, or MIPS ISAs, or any other suitable ISA. In multiprocessor systems, each of processors 602 may commonly, but not necessarily, implement the same ISA.

System memory 604 may be configured to store program instructions 620 accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. Additionally, existing camera control data 622 of memory 604 may include any of the information or data structures described above. In some embodiments, program instructions 620 and/or data 622 may be received, sent or stored upon different types of computer-accessible media or on similar media separate from system memory 604 or computer system 600. In various embodiments, some or all of the functionality described herein may be implemented via such a computer system 600.

In one embodiment, I/O interface 606 may be configured to coordinate I/O traffic between processor 602, system memory 604, and any peripheral devices in the device, including network interface 610 or other peripheral interfaces, such as input/output devices 612. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the function of I/O interface 606 may be split into two or more separate components, such as a north bridge and a south bridge, for example. Also, in some embodiments some or all of the functionality of I/O interface 606, such as an interface to system memory 604, may be incorporated directly into processor 602.

Network interface 610 may be configured to allow data to be exchanged between computer system 600 and other devices attached to a network 624 (e.g., carrier or agent devices) or between nodes of computer system 600. Network 624 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 610 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 612 may, in some embodiments, include one or more display terminals, keyboards, keypads, touchpads, scanning devices, voice or optical recognition devices, or any other devices suitable for entering or accessing data by one or more computer systems 600. Multiple input/output devices 612 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 610.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:

an optical element;

an image sensor configured to receive light that has passed through the optical element; and an actuator arrangement, comprising:

a tilt actuator; and a carrier to which the optical element or the image sensor is fixedly coupled, wherein the carrier comprises:

an end stop portion, comprising:

a side of the carrier that is proximate a stationary structure of the camera, wherein the side comprises an arced surface such that the side is spaced apart from the stationary structure at a non-uniform gap; and at least one end stop adjacent the arced surface, wherein the at least one end stop is configured to make contact with the stationary structure of the camera to limit tilt motion of the carrier enabled by the tilt actuator.

2. The camera of claim 1, wherein the carrier is configured to move on ball bearings, such that the carrier suspends the optical element or the image sensor from a base structure of the camera and allows motion, within a range of motion limited at least in part by the at least one end stop, of the optical element or the image sensor enabled by the tilt actuator.

3. The camera of claim 2, wherein an underside of the carrier at least partially defines a ball bearing track that interfaces with the ball bearings to provide tilt motion about a tilt axis, and wherein the underside of the carrier is opposite the side of the carrier that is proximate the stationary structure, relative to the tilt axis.

4. The camera of claim 1, wherein a minimum distance, between a center point of the arced surface and a side of the stationary structure facing the arced surface, defines a minimum of the non-uniform gap.

5. The camera of claim 1, wherein the stationary structure comprises a shield can of the camera.

6. The camera of claim 1, wherein:

the optical element comprises a light path folding element; and the light path folding element is fixedly coupled with the carrier such that the light path folding element and the carrier are tiltable together relative to the image sensor.

7. The camera of claim 6, wherein the light path folding element comprises:

a prism; or a mirror.

8. A device, comprising:

one or more processors;

memory storing program instructions executable by the one or more processors to control operations of a camera; and the camera, comprising:

an optical element;

an image sensor configured to receive light that has passed through the optical element; and an actuator arrangement, comprising:

a tilt actuator; and a carrier to which the optical element or the image sensor is fixedly coupled, wherein the carrier comprises:

an end stop portion, comprising:

a side of the carrier that is proximate a stationary structure of the camera, wherein the side comprises an arced surface such that the side is spaced apart from the stationary structure at a non-uniform gap; and at least one end stop adjacent the arced surface, wherein the at least one end stop is configured to make contact with the stationary structure of the camera to limit tilt motion of the carrier enabled by the tilt actuator.

9. The device of claim 8, wherein the carrier is configured to move on ball bearings, such that the carrier suspends the optical element or the image sensor from a base structure of the camera and allows motion, within a range of motion limited at least in part by the at least one end stop, of the optical element or the image sensor enabled by the tilt actuator.

10. The device of claim 9, wherein an underside of the carrier at least partially defines a ball bearing track that interfaces with the ball bearings to provide tilt motion about a tilt axis, and wherein the underside of the carrier is opposite the side of the carrier that is proximate the stationary structure, relative to the tilt axis.

11. The device of claim 8, wherein the stationary structure comprises a shield can of the camera.

12. The device of claim 11, wherein a minimum distance, between a center point of the arced surface and an underside of the shield can, defines a minimum of the non-uniform gap.

13. The device of claim 8, wherein:

the optical element comprises a lens group that includes one or more lens elements; and the lens group is fixedly coupled with the carrier such that the lens group and the carrier are tiltable together relative to the image sensor.

14. The device of claim 8, wherein the at least one end stop comprises:

a first end stop adjacent the arced surface, wherein the first end stop is configured to limit tilt motion, about a tilt axis, in a clockwise direction; and a second end stop adjacent the arced surface, wherein the second end stop is configured to limit tilt motion, about the tilt axis, in a counterclockwise direction.

15. The device of claim 8, wherein the tilt actuator comprises a voice coil motor (VCM) actuator, and the VCM actuator comprises:

a magnet; and a coil positioned proximate the magnet so as to be capable of electromagnetically interacting with the magnet to produce Lorentz forces that move carrier.

16. A system, comprising: a tilt actuator; and a carrier to which an optical element or an image sensor of a camera is fixedly coupled, wherein the carrier is configured to move on ball bearings, such that the carrier suspends the optical element or the image sensor from a base structure of the camera and allows tilt motion of the optical element or the image sensor enabled by the tilt actuator, and wherein the carrier comprises: an end stop portion, comprising: a side of the carrier comprising an arced surface; and at least one end stop adjacent the arced surface, wherein the at least one end stop is configured to make contact with a stationary structure of the camera to limit the tilt motion to a limited range of motion that is smaller than a range of motion that the arced surface would allow without the at least one end stop.

17. The system of claim 16, wherein an underside of the carrier at least partially defines a ball bearing track that interfaces with the ball bearings to enable the tilt motion about a tilt axis, and wherein the underside of the carrier is opposite the side of the carrier that comprises the arced surface, relative to the tilt axis.

18. The system of claim 16, further comprising:

a shield can to at least partially encase the camera;

wherein the side comprising the arced surface is spaced apart from the shield can at a non-uniform gap.

19. The system of claim 18, wherein the arced surface is convex towards an underside of the shield can, and wherein a minimum distance, between a center point of the arced surface and the underside of the shield can, defines a minimum of the non-uniform gap.

20. The system of claim 16, wherein the at least one end stop comprises a protrusion having an uppermost surface facing the underside of the shield can, and wherein the uppermost surface is planar.

* * * * *